Feb. 14, 1961 B. E. ENSSLE 2,971,492

CONTROL SYSTEM BASED UPON RECORDING AND MEMORY FUNCTIONS

Filed Aug. 5, 1959 3 Sheets-Sheet 1

INVENTOR.
Bruno E. Enssle
-BY-
Glenn B. Evans
Attorney

CONTROL SYSTEM BASED UPON RECORDING AND MEMORY FUNCTIONS

Filed Aug. 5, 1959 3 Sheets-Sheet 2

INVENTOR.
Bruno E. Enssle
BY
Glenn B. Morse
Attorney

CONTROL SYSTEM BASED UPON RECORDING AND MEMORY FUNCTIONS

Filed Aug. 5, 1959 3 Sheets-Sheet 3

INVENTOR.
Bruno E. Enssle
-BY-
Glenn B. [signature]
Attorney

United States Patent Office 2,971,492

Patented Feb. 14, 1961

2,971,492

CONTROL SYSTEM BASED UPON RECORDING AND MEMORY FUNCTIONS

Bruno E. Enssle, P.O. Box 387, Boulder, Colo.

Filed Aug. 5, 1959, Ser. No. 831,783

4 Claims. (Cl. 118—2)

This invention relates to control systems, and the preferred form has been developed with reference to conveyorized factory operations. Many of these operations create an environment which tends to interfere with the operation of control mechanisms, and it therefore becomes desirable to displace the control mechanism far enough from the point of performing the operations that the adverse conditions are no longer present. An examplеof such a situation is in the application of coloring and other solutions to hides of leather moving along a conveyor. It is recognized that the application of material only to the leather, rather than directing it in a continuous application to the full width of the conveyor, will result in tremendous savings. The difficulty of operating a sensitive control mechanism in the immediate area where spraying application is being performed is obvious. The existence of this problem has been recognized, and various devices have been developed for operating a detection system at a station "upstream" from the processing station, with a transfer of the detected data downstream with the conveyor so that the spraying units are energized at the precise moment that the recorded area passes under the point of spray application. Another arrangement has been utilized in which what amounts to a recorded image of the leather outline is established at an upstream position, and which is transferred through a memory system establishing a sufficient time delay such that the spraying device will operate against a similar outline of leather at the precise moment in which the hide is in the proper position within the spray booth area. Such a mechanism is described and claimed in my Patent Number 2,754,795, issued on July 17, 1956.

The present invention, in its preferred form, provides an independent and primarily mechanical recording and memory mechanism operating in conjunction with each of a series of spray devices to control their operation. A control unit is directly upstream from the associated spray device, and each system including the control unit and the spray unit is independent from the other systems of the group. With this arrangement, it becomes unnecessary to accurately collect the group of signals established by the detecting units and form a total image of an outline of a conveyed object. The formation of a control image is often referred to as the "scanning" technique, and the establishment and utilization of this image presents a great many technical problems which are eliminated by the use of a simple recording and memory unit directly associated with a fixed spray point. A group of these systems produces a very effective application of the spray material. It has the further advantage that any disturbance in the mechanism is restricted to a single portion of it, and does not block the functioning of the entire operation.

A particular form of recording and memory device has been found specially effective in the control system described herein, and this type of device is described and claimed in my co-pending application Serial Number 722,-319, filed on March 18, 1958. The recording and memory unit illustrated and described herein is a further development of that device, and operates upon the same general mechanical principles. Several features are incorporated in the latter development which improve the functioning and reliability.

The several features of the invention will be analyzed in detail through a discussion of the particular embodiments illustrated in the accompanying drawings. In the drawings:

Figure 1 presents a schematic plan view of an installation involving a group of recording and memory devices and a group of spray units, positioned as in a normal installation above a conveyor surface. Figure 1 also illustrates the use of a distributing mechanism for applying a rubbing action to the surface of the leather after the application of the sprayed liquid.

Figure 2 presents a perspective view showing the detecting and memory units and the spray devices in operating position over a conveyor.

Figure 3 presents a sectional elevation on an enlarged scale taken on a plane perpendicular to the axis of rotation of the recording and memory units.

Figure 4 presents a section showing an alternative position of the control mechanism from that of Figure 3.

Figures 1, 5, 6:
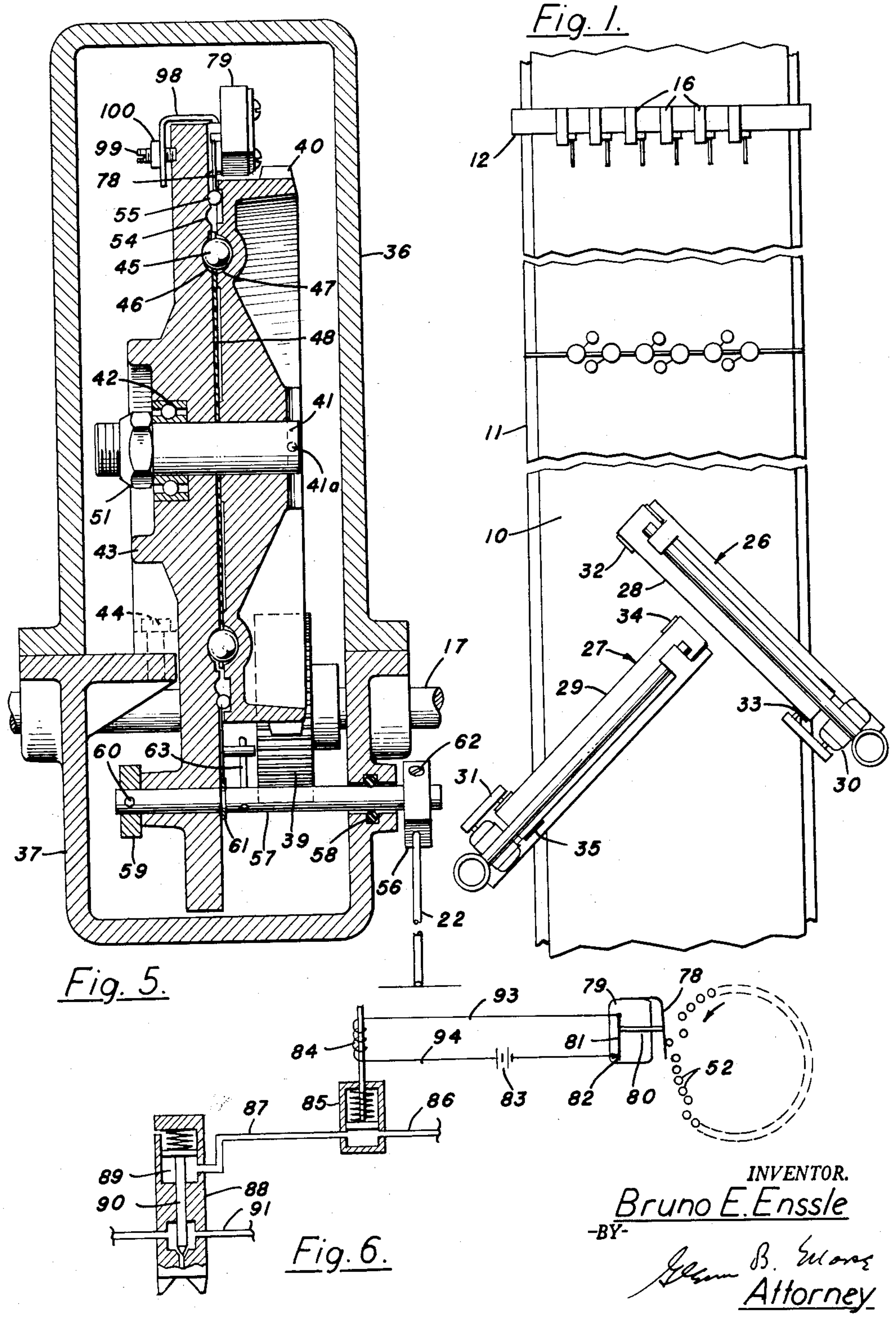
Figure 5 is a section taken on the plane 5—5 of Figure 3.
Figure 6 is a schematic diagram showing the system for the utilization of the recorded data for controlling the spray guns.

Referring to Figure 1, the moving conveyor surface 10 may be of any conventional construction such as a belt or a series of spaced bands, and is supported upon the frame 11. An auxiliary frame 12 includes the vertical columns 13 and 14 which support the transverse beam 15 on which the recording and memory units 16 are mounted. A driving shaft 17 is rotatably mounted with respect to the beam 15 in suitable bearing blocks 18, and is driven through the sprocket 19 and the chain 20 at a rate of rotation which is fixed with respect to the rate of movement of the conveyor surface 10. As a piece of leather 21 is carried in the direction of the arrow in Figure 2, its presence is detected by the actuators 22 which control the recording functions of the devices 16, and the recorded data is applied to control the action of the spray guns 23 after a predetermined lapse of time which will be exactly sufficient to move a particular area on the hide 21 from the point of detection directly downstream to a point under the associated spray gun 23. These spray guns, and their associated pipes and electrical conduits, are supported by the opposite columns 24 and 25 which are normally fixed with respect to the frame 11 of the conveyor.

After the application of sprayed liquid by the guns 23, the hides 21 are carried down into the area operated upon by the rubbing devices 26 and 27. These devices each include a moving belt as indicated at 28 and 29, respectively, which is driven by a motor unit and power transfer system as shown at 30 and 31. The lower courses of the belts 28 and 29 bear against the surface of the hides to distribute and work the surface for proper distribution of the liquid. The units 26 and 27 are disposed at a slant with respect to the path of the conveyor movement to maintain the hides flat against the conveyor, each of the belts 28 and 29 tending to pull the hides in a direction "downstream" along the conveyor, and to the opposite side to create the flattening tendency. Preferably, the axis of rotation of the end pulleys 32—33 and 34—35 are inclined to the horizontal to elevate the upstream edge of the belts slightly.

The details of the recording and memory units 16 are best shown in Figures 3, 4, 5, and 7. Each of these units includes a split housing, with the upper section 36 being secured to the lower section 37 by suitable screws as shown at 38 in Figure 3. The shaft 17 rotates a gear 39 associated with each of the units, which meshes with a gear 40 mounted on the shaft 41. This shaft is supported in the bearing 42 installed in the bracket 43, which is normally fixed with respect to the lower housing section 37 through the action of the bolts 44. The axis of rotation of the gear 40 is stabilized through the peripherally-spaced balls 45 which operate within the opposite races 46 (in the bracket 43) and 47 (in the gear 40). A spacer disc 48 maintains the peripheral relative position of the balls. A transverse pin 41a engages the shaft 41, and is received within grooves 49 or 50 in the gear 40, and the nut 51 engaging the threaded end of the shaft 51 is tightened until the looseness in the mounting of the gear 40 is eliminated. Preferably, the nut 51 is of a type commonly known to resist accidental displacement.

The gear 40 is provided with a group of recesses, each of which is preferably inclined somewhat to a radius, and the entire group being arranged in an annular pattern. These recesses are identified at 52 in Figure 3, and are arranged opposite the two substantially annular and concentric grooves 53 and 54 in the bracket 43. The grooves 53 and 54, together with the recesses 52 cooperate to position the collection of small balls 55 at either of two radial distances from the center of the axis of rotation. The placement of an individual ball in either of the two alternative positions constitutes the recording of the data utilized to control the spray guns.

The actuating mechanism used for determining the alternative position of the balls involves the rod-shaped detectors 22 which are normally fixed with respect to the blocks 56 carried on the shaft 57 which is pivotally mounted in the lower housing section 37. A sealing ring 58 is preferably incorporated at the point of entrance of the shaft 57 into the lower housing section 37, and a collar 59 is normally used for the axial location of the shaft 57 with respect to the housing. A transverse pin 60, or any other convenient means, may be used to secure the collar 59 in position. The retaining ring 61 may also be used for controlling the axial position, in the event that the block 56 is not relied upon for this purpose. It is preferable that the block 56 be permitted to have some degree of axial adjustment along the shaft 57 to selectively determine the exact point of detection. A screw 62 may be used to maintain the adjusted position.

As an area of leather moves underneath one of the detectors 22, the movement of the detector is converted into a rotation of the shaft 57, and a consequent rotation of the arm 63. (Refer to Figure 4.) This movement is communicated to the dog 64 by the stud 65, resulting in rotation of the dog 64 about the pivot 66 from the position shown in Figure 3 to that of Figure 4. The pivot 66 is received within a suitable bearing formed in the bracket 43. The effect of this movement is to position the upper surface 67 of the dog 64 to permit the balls 55 to proceed along the outer groove 53. Placement of the dog in the position shown in Figure 4 results in the balls 55 continuing their movement along the inner groove 54. Regardless of whether a particular ball is introduced into the inner groove 54 or the outer groove 53, it continues in movement until the end of that groove is reached at the position shown at 68 in Figure 4. Gravity then permits the balls to move downward into a common position, in preparation for being placed in either of the annular grooves 53 and 54 as movement of the gear 40 proceeds.

Figures 4, 7:
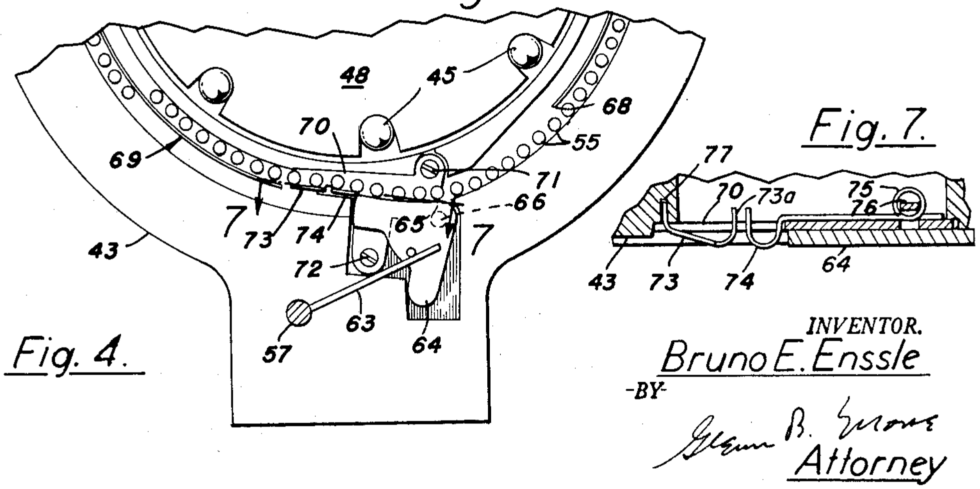
Figure 7 is a section taken on the plane 7—7 of Figure 4.

An arrangement which is best shown in Figure 7 is incorporated to eliminate the possibility that a particular ball might collide head-on with the beginning of the separating wall 69 between the grooves 53 and 54. A plate 70 is secured to the bracket 43 by the screws 71 and 72, and is used primarily to locate the free end 73a of the U-shaped wire member 73, and support the cantilever deflector wire 74. The deflector 74 has a coil 75 engaging the ear 76 on the plate 70, and the net effect of the mounting of the deflector 74 is to permit some degree of lateral movement in the event of a head-on collision of one of the balls 55 so that the ball will be urged laterally into either one or the other of the grooves 53 or 54 without jamming the mechanism. The U-shaped wire 73 is pivotally mounted in the bracket 43 at the hole 77, and the slight freedom of movement of the end 73a permits the wire 73 to accommodate itself to the position of the balls.

Figure 2:
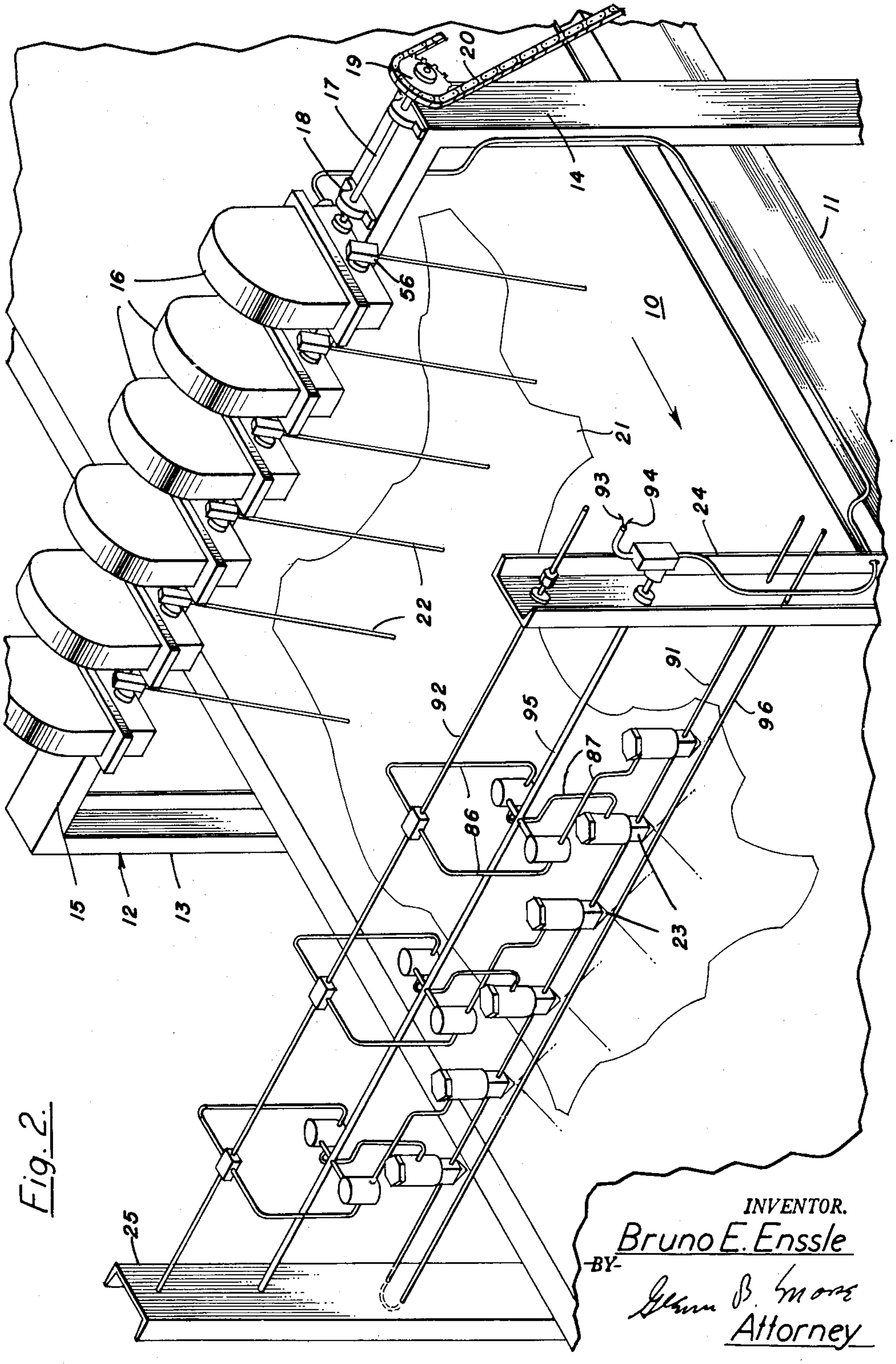
Figure 3:
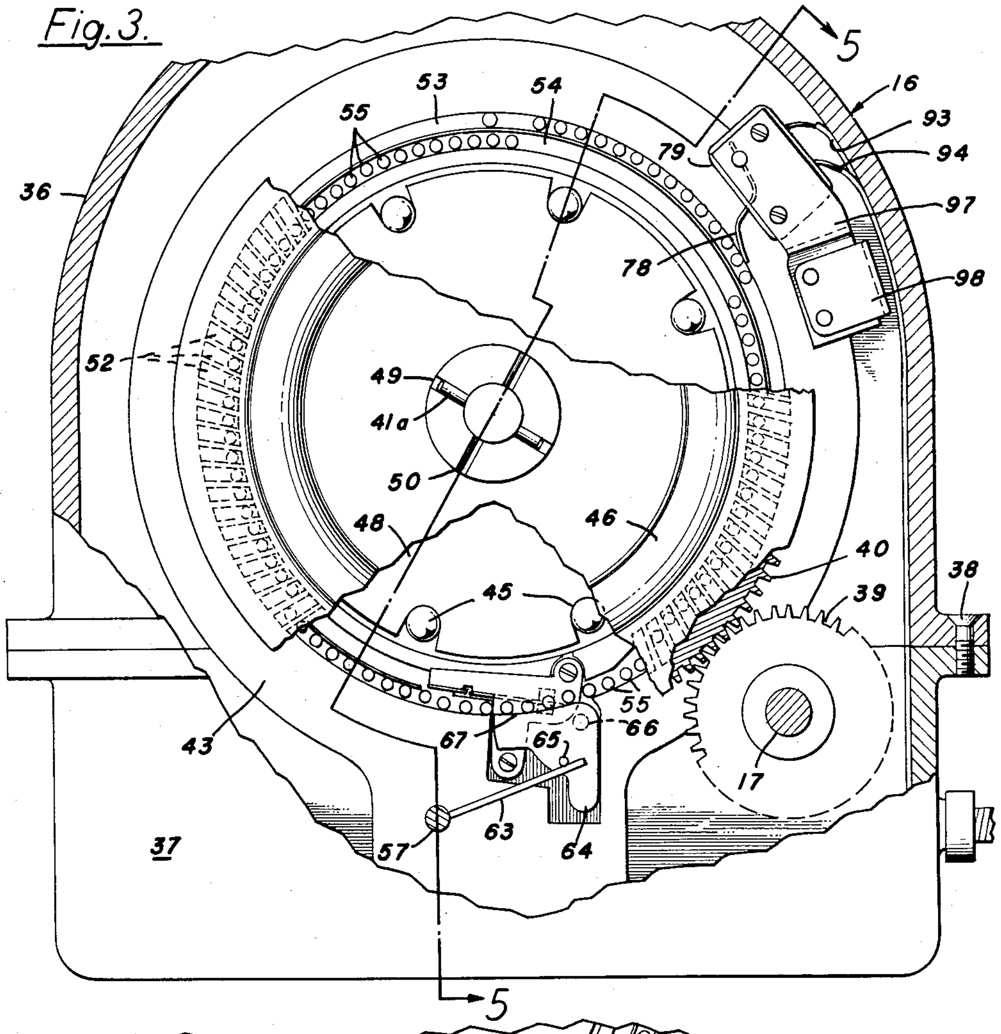

The utilization of the position of the balls 55 in order to control the spray guns is accomplished through the arrangement shown in Figure 6. With the balls moving in the direction of the arrow, those in the outer annular groove 53 pass a position in which they bear against the arm 78 of the switch mechanism 79. This movement is communicated through the plunger 80 to the contact arm 81, which closes the contact at 82. A circuit is then completed through the battery 83 (or some other source of potential), and the solenoid 84. This action opens the valve unit 85 permitting compressed air to move from the conduit 86 thorugh the connection 87 to the spray gun 88. Pressure in the chamber 89 elevates the needle 90 which permits a discharge of the liquid supplied through the tube 91. Referring to Figure 2, the air lines 86 are fed by a supply pipe 92, and the wires 93 and 94 are housed in a conduit 95 which is associated with the detection systems 16. The liquid-supply line 91 is preferably connected to a return line 96 so that circulation of the liquid can be maintained.

The switches 79 are mounted on the brackets 97 for adjustment to various positions about the axis of rotation of the gear 40. These brackets include a C clamp 98 embracing the edge of the bracket 43, and a setscrew 99 received in an annular groove in the bracket 43. Loosening setscrew 99 permits the switch assembly to be moved to various positions corresponding to various distances from the recording point where the dog 64 is operating. The locknut 100 is included for securing the setscrew 99.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a conveyor, a control system for a group of devices operating at a particular station along said conveyor, comprising: a plurality of detecting units, each one of said units being associated with only one of said devices, each unit including a rotatable shaft operably connected with said conveyor for rotation in predetermined relationship therewith, a rotary member driven by said shaft, said rotary member having an annular group of elongated recesses each disposed at an angle to a tangent to a circle concentric with the axis of rotation of said rotary member, a fixed bracket having at least two concentric grooves opposite said annular group of recesses, said grooves having communicating ends, a ball confined between each of said recesses and one of said grooves, an actuator having a portion responsive to the presence of an object carried by said conveyor at a particular station for positioning said balls in one or the other of said grooves at an end thereof, and signal means including a switch arm disposed between said rotary member and said bracket at a selected point along a portion of the path of movement of said balls to intercept said balls moving in one of said grooves to generate a signal in response thereto, and avoid intercepting said balls moving in the other of said grooves; and control means for said device responsive to said signal means, the distance in the direction of movement of said conveyor from said actuator to said device being related to the distance along the path of movement of said balls and from said actuator to said signal means, with respect to the relative rate of movement between said conveyor and said rotary member, to cause said device to operate on points on objects detected by said detecting units.

2. In combination with a conveyor, a control system for a group of devices each operating at a particular station along said conveyor, comprising: a plurality of detecting units, each one of said units being associated with only one of said devices, each unit including a rotatable shaft operably connected with said conveyor for rotation in predetermined relationship therewith, a rotary member driven by said shaft, said rotary member having an annular group of elongated recesses each disposed at an angle to a tangent to a circle concentric with the axis of rotation of said rotary member, a fixed bracket having at least two concentric grooves opposite said annular group of recesses, a ball confined between each of said recesses and one of said grooves, an actuator having a portion responsive to the presence of an object carried by said conveyor at a particular station for positioning said balls in one or the other of said grooves, and signal means disposed at a selected point along a portion of the path of movement of said balls to intercept said balls moving in one of said grooves to generate a signal in response thereto, and avoid intercepting said balls moving in the other of said grooves; and control means for said device responsive to said signal means, the distance in the direction of movement of said conveyor from said actuator to said device being related to the distance along the path of movement of said balls from said actuator to said signal means, with respect to the relative rate of movement between said conveyor and said rotary member, to cause said device to operate on points on objects detected by said detecting units.

3. In combination with a conveyor, a control system for a group of devices operating at a particular station along said conveyor, comprising: a plurality of detecting units, each one of said units being associated with only one of said devices, each unit including a normally moving member operably connected with said conveyor for movement in predetermined relationship therewith, a plurality of members carried by said moving member and displaceable with respect thereto, an actuator having a portion responsive to the presence of an object carried by said conveyor at a particular station for positioning said displaceable members, means for maintaining the position of said displaceable members determined by said actuator with respect to said moving member for a predetermined portion of the path of movement of said displaceable members established by said moving member, and signal means disposed at a selected point along said portion of the path of movement of said displaceable members to intercept said displaceable members in one position thereof to generate a signal in response thereto, and avoid intercepting said displaceable members in another position thereof; and control means for said device responsive to said signal means, the distance along and in the direction of movement of said conveyor from said actuator to said device being related to the distance along the path of movement of said displaceable members from said actuator to said signal means, with respect to the relative rate of movement between said conveyor and said moving member, to cause said device to operate on points on objects detected by said detecting units.

4. In combniation with a conveyor, a control system for a group of devices operating at a particular station along said conveyor, comprising: a plurality of detecting units, each one of said units being associated with only one of said devices, each unit including a normally moving member operably connected with said conveyor for movement in predetermined relationship therewith, recording means carried by said moving member, an actuator having a portion responsive to the presence of an object carried by said conveyor at a particular station for activating said recording means, means for maintaining the position of said recording means determined by said actuator with respect to said moving member for a predetermined portion of the path of movement of said recording means established by said moving member, and signal means disposed at a selected point along said portion of the path of movement of said recording means and responsive thereto; and control means for said device responsive to said signal means, the distance in the direction of movement of said conveyor from said actuator to said device being related to the distance along the path of movement of said recording means from said actuator to said signal means, with respect to the relative rate of movement between said conveyor and said moving member, to cause said device to operate on points on objects detected by said detecting units.

References Cited in the file of this patent

UNITED STATES PATENTS

| | | |
|---|---|---|
| 2,675,778 | Peeps | Apr. 20, 1954 |
| 2,754,795 | Enssle | July 17, 1956 |